F. A. STEVENS.
OPHTHALMIC MOUNTING.
APPLICATION FILED OCT. 3, 1919.
1,383,872.
Patented July 5, 1921.
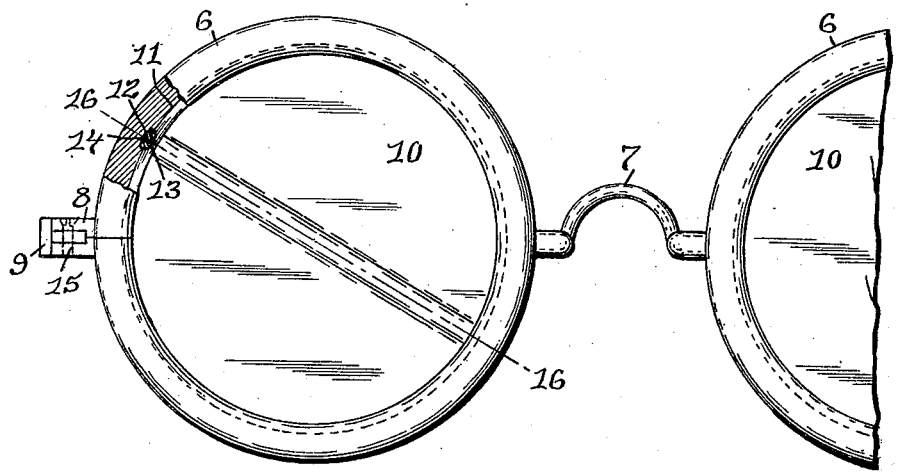
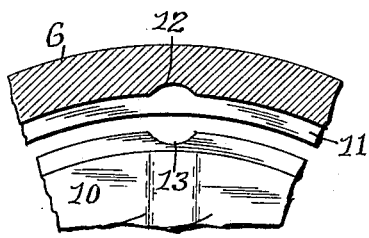
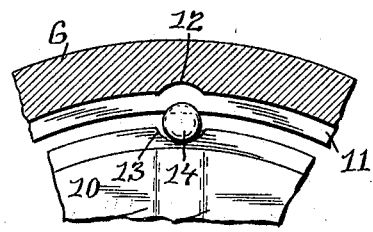
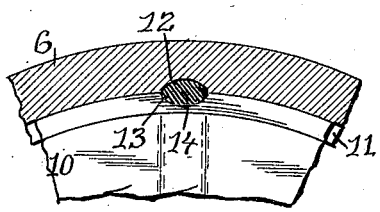
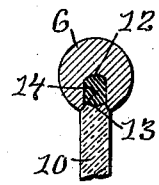
INVENTOR:
Frederick Arthur Stevens
By Chas. H. Luther
ATTORNEY.

UNITED STATES PATENT OFFICE.

FREDERICK ARTHUR STEVENS, OF PROVIDENCE, RHODE ISLAND, ASSIGNOR TO STEVENS AND COMPANY, INCORPORATED, OF PROVIDENCE, RHODE ISLAND, A CORPORATION OF RHODE ISLAND.

OPHTHALMIC MOUNTING.

1,383,872.  Specification of Letters Patent.  Patented July 5, 1921.

Application filed October 3, 1919. Serial No. 328,102.

*To all whom it may concern:*

Be it known that I, FREDERICK ARTHUR STEVENS, a citizen of the United States, residing at Providence, in the county of Providence and State of Rhode Island, have invented a new and useful Improvement in Ophthalmic Mountings, of which the following is a specification.

My invention has reference to an improvement in ophthalmic mountings and more particularly to an improvement in means for locking the lenses in the rims of spectacles, eye-glasses and similar ophthalmic mountings.

The objects of my invention are to improve the construction of spectacles, eye glasses and the like, whereby the lenses are located in the rims, locked against rotation in the rims, and looseness of the lenses in the rims eliminated.

My invention consists in the peculiar and novel construction of spectacles, eye-glasses and similar forms of ophthalmic mountings, in which the lenses are locked in the rims by a compressible locking member located in notches in the rim and lenses, whereby the lenses are locked in the rims, by compressing the compressible locking member into the notches in the rims and lenses, in fastening the lenses in the rims.

Figure 1 is an enlarged face view of the greater portion of a spectacle frame provided with my improved means for locking the lenses in the rims.

Figs. 2, 3, and 4 are still further enlarged detail sectional views, Fig. 2 showing the rim separated from the lens, Fig. 3 showing the compressible locking member in place and Fig. 4 showing the lens locked to the rim, and Fig. 5 is an enlarged detail transverse sectional view through the rim and lens in the locked position.

In the drawing 6 indicates a spectacle rim connected to the usual bridge 7 and split end piece 8 to which the usual temple 9 is pivotally secured, and 10 the lens.

The rim 6 has the lens groove 11 in which is a small semi-oval notch 12 forming a part of the locking means and which has been previously located on a line with the axis of the lens. The method of locating this notch is described and claimed in a companion application for a patent on the method of locking lenses in the rims of spectacles and the like, of even date herewith.

The lens 10 has a semi-oval notch 13 in its periphery corresponding to the notch 12 in the rim, and is formed in the periphery of the rim on a line with the axis 16 of the lens, and opposite to the semi-oval notch in the rim.

A compressible locking member 14 is formed preferably spherical in shape, and of lead or other suitable compressible material. The locking member 14 is of a size which when compressed, will practically fill the space formed by the notches 12 and 13, when the rim is closed onto the lens, in securing the lens in the rim, by tightening the screw 15, in the split end piece 8 in the usual way.

In the use of spectacles and the like having circular rims and in which circular lenses are held in the rims by friction only, the lenses are liable to and have at times turned in the rims, from wiping or cleansing the lenses and from other causes. This is extremely detrimental, particularly so in lenses in which the axis is located for astigmatism, as a slight turning movement of the lens in the frame, will give a defective vision, cause strain on the eye, and ruin the utility of the glasses until the fault is corrected.

In the use of my improvement in ophthalmic mountings, a lens is locked in the rim on a line with the axis of the lens, by compressing a compressible locking member into notches in the lens and rim, on a line with the axis of the lens, in securing the lens in the rim, in the usual way, and looseness of the lenses in the rims is thereby eliminated.

It is evident that as the lens is locked to the rim always on a line with the axis of the lens, the point of locking may be at any one of the three hundred and sixty degrees of the circle, and a compressible locking member is preferable, to accomplish this result.

Having thus described my invention, I claim as new :—

1. An ophthalmic mounting comprising a circular rim, a circular lens in the rim and ground on its surface to correct visual defects of the eye, and compressible means, intermediate the rim and the lens, for locking the lens within the rim, on a line with the axis of the lens.

2. An ophthalmic mounting comprising a circular rim having a lens groove and a notch in the lens groove, a circular lens in the lens groove and ground on its surface to correct visual defects of the eye, and having a notch in its edge on a line with the axis of the lens and in oppositely disposed relation to the notch in the rim, a compressible locking member intermediate the notches in the rim and lens, whereby in securing the lens in the rim, the locking member is compressed into the notches in the rim and lens, thereby locking the lens within the rim, on a line with the axis of the lens.

In testimony whereof, I have signed my name to this specification.

FREDERICK ARTHUR STEVENS.